UNITED STATES PATENT OFFICE.

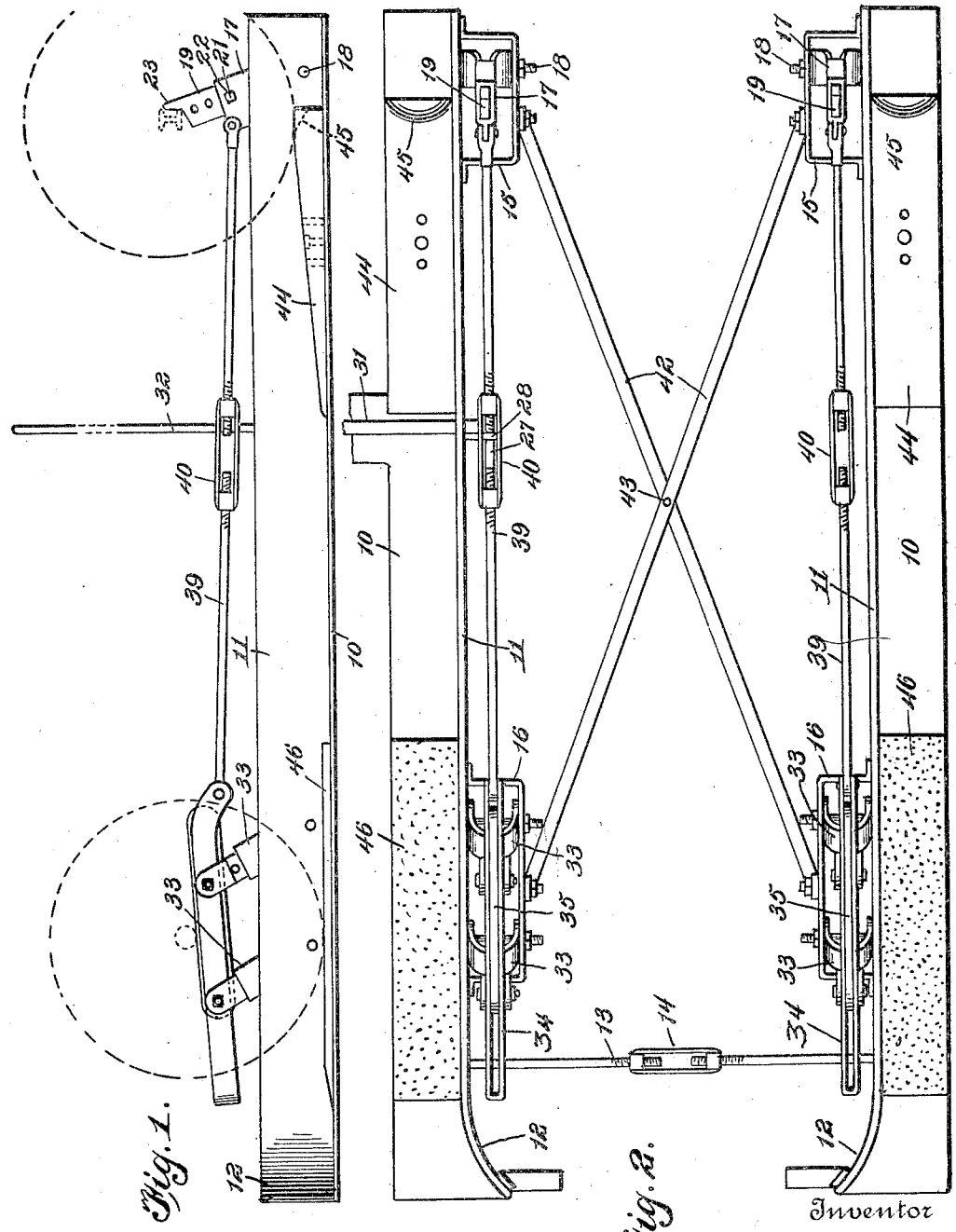

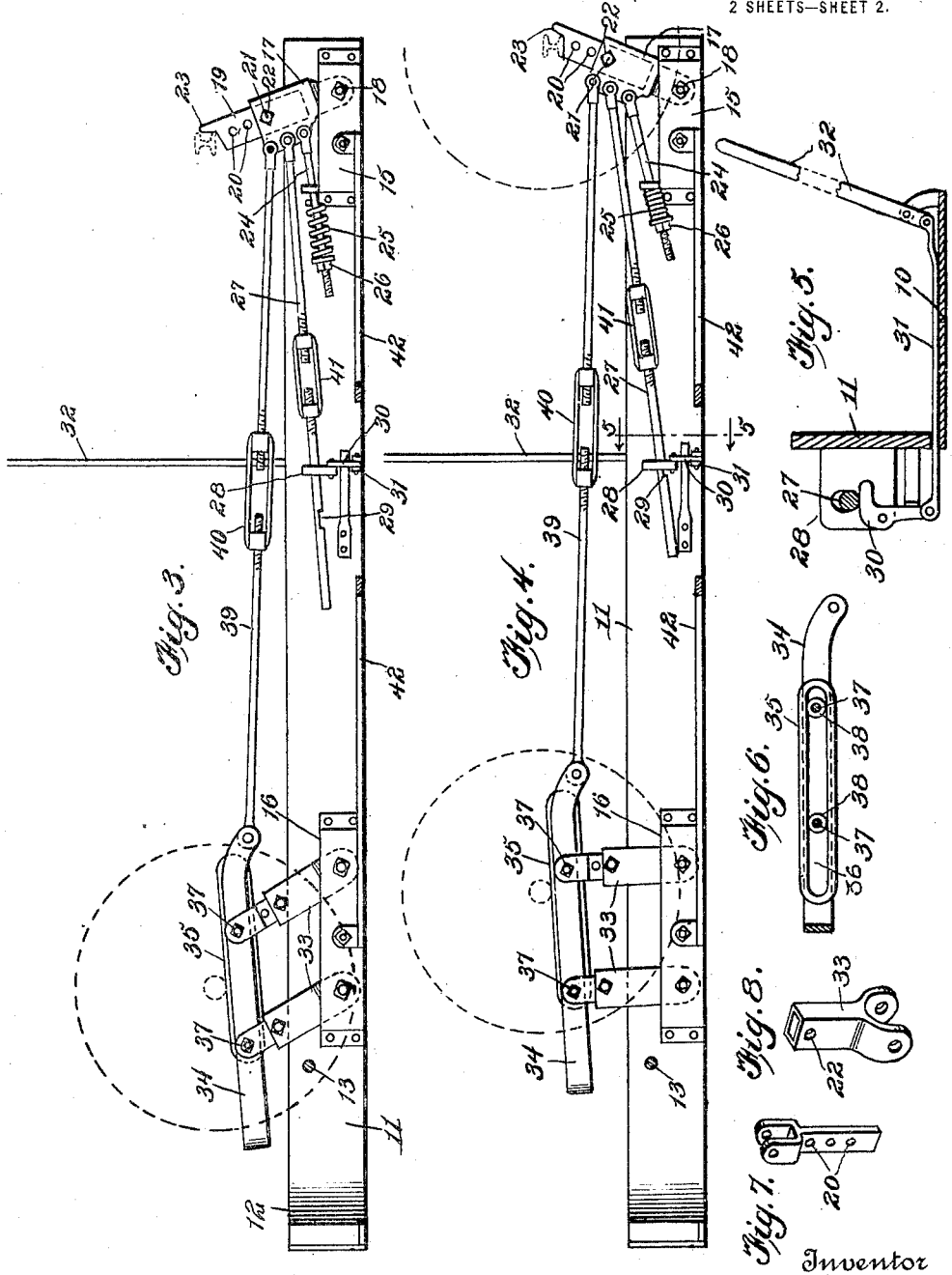

LOUIS M. FISHER, OF CLARKSDALE, MISSOURI.

AUTOMATIC AUTOMOBILE-JACK.

1,345,842.                     Specification of Letters Patent.      Patented July 6, 1920.

Application filed March 11, 1919. Serial No. 282,020.

*To all whom it may concern:*

Be it known that I, LOUIS M. FISHER, a citizen of the United States, residing at Clarksdale, in the county of Dekalb and State of Missouri, have invented new and useful Improvements in Automatic Automobile-Jacks, of which the following is a specification.

This invention relates to automobile jacks or lifting devices, having for its primary object to provide means of a simple nature operated by the momentum of a vehicle for causing the same to lift the vehicle bodily from the ground and to hold the same in such position.

A further object of the invention is to provide lifting mechanism of the character stated constituting a strong and rigid support for the vehicle when the latter is at rest, and which may be readily actuated to automatically discharge the vehicle therefrom when desired.

A further object of the invention is to provide a jack of the character stated which operates automatically upon entry of a vehicle upon the same and locks the mechanism with the vehicle in raised position; the mechanism being constructed and arranged in such manner as to be capable of being adjusted so as to accommodate vehicles varying in length and breadth.

A still further object of the invention is to provide a device of the character stated which is featured by the lack of complicated mechanism; which has those parts which directly support the weight of the vehicle so arranged as to evenly distribute the weight of the vehicle and thus obviate overstraining of certain of the parts; which may be "built in" or made a permanent part of a garage or which may be constructed so as to be readily transported; which embodies novel discharge means for delivering the vehicle from the jack, and which will prove highly practical and efficient in use.

With these and other objects in view, the invention consists of the features of construction, combination and arrangement of parts hereinafter fully described and claimed, reference being had to the accompanying drawings, in which:—

Figure 1 is a side elevation of a vehicle jack constructed in accordance with the invention, the view illustrating the parts in the position they will assume as the vehicle enters upon the same, Fig. 2 is a top plan view of the device shown in Fig. 1, Fig. 3 is a longitudinal sectional view taken through the jack with the parts in the position shown in Fig. 1, Fig. 4 is a view similar to Fig. 3, and showing the parts in the position they will assume with the vehicle supported upon the jack, Fig. 5 is a detail sectional view taken upon line 5—5 of Fig. 4, Fig. 6 is a fragmentary sectional view taken through one of the rear axle supporting members, and Figs. 7 and 8 are detail perspective views of the parts constituting the sectional supporting arm.

The jack of the present invention embodies a structure of a portable nature, so that the same may be applied to or moved from the floor of the garage with expediency. The jack includes a frame constituting tracks 10 arranged in spaced parallel relation and upon which the wheels of the vehicle travel. These tracks may be made of thin sheet metal or any other preferred material, and each is provided at its inner edge with an upstanding guard rail 11. The forward ends of these guard rails are deflected or curved toward each other as at 12, and these curved portions constitute guides for directing the front wheels of the vehicle upon the tracks 10. The guard rails are connected together near their forward ends by the rod 13, the latter having a turnbuckle or other adjusting device 14 therein to permit of the said rod being lengthened or shortened. This rod and turnbuckle enables the tracks to be moved toward or away from each other, whereby to accommodate themselves to vehicles varying in width.

The guard rails 11 are provided upon their adjacent faces and near the forward and rear ends thereof with housings 16 and 15, the latter of which have pivotally mounted therein the lower portions 17 of supporting arms for the front axle of the vehicle. The lower portion of this arm member is bifurcated as shown, and a pivot pin 18 extends through these furcations and pivotally secures the same between the housing and the guard rail. The upper portion of the member 17 is recessed as shown, and receives the upper arm portion 19. This upper portion is provided with a series of openings 20, through one of which a bolt 21 may be extended, the said bolt also extending through openings 22 in the upper end of the member 17. This particular construction enables the arm to be lengthened or shortened, as the upper portion 19 may be readily adjusted within the said lower arm portion. The upper extremity of arm portion 19 supports the front axle of the vehicle, and an abutment 23 is provided upon this said portion to be engaged by the said axle when the latter moves over the arm, and causes the said arm to be swung rearwardly or into upright position.

The arms at the rear end of the tracks are arranged in lateral alinement and are identical in construction, and each of these arms has pivoted thereto one end of a rod 24. These rods extend forwardly through suitable openings in the housing 15, and each rod has arranged thereon a helical spring 25. The tension of these springs may be adjusted by the nuts 26 on the ends of the rods. It will be observed that the springs 25 upon the rods 24 are relatively short, and are not brought into engagement with the adjacent face of housing 15 until the arms have reached substantially vertical position or the vertical dead center, and the said springs are not tensioned until after the arms have passed beyond the dead center. When these springs have been tensioned, however, it is their tendency to move the arms back past the dead center and into normal or lower position, as will be understood.

One of the arms also has pivoted thereto one end of a latch bar 27, the free end of which extends loosely through an opening in a latch plate 28 secured to the inner face of guard rail 11. The underside of this latch bar is notched as at 29 so as to provide a locking shoulder to engage with the plate portion defining the bar receiving opening. This notched or shouldered portion upon the latch bar is so positioned as not to be engaged with the latch plate until the axle supporting arm has been moved rearwardly past dead center, but after the arm has reached such position the shoulder upon the latch bar will engage with the latch plate so as to hold the axle supporting arms against forward movement.

The latch plate 28 has pivoted thereon a bell crank lever 30, one arm of which is disposed beneath the latch bar 27 and in position to engage and raise the latter to lift the notch thereon out of engagement with the latch plate when the bell crank lever is moved in one direction. The opposite arm of the bell crank is connected by a link 31 with the hand-operated lever 32 arranged beyond the track and in a position convenient to the reach of a person occupying the driver's seat of a vehicle upon the jack. The construction and arrangement is such that when the axle supporting levers are at the limit of their rearward movement and the springs 25 are tensioned, the occupant of the driver's seat of the vehicle supported by these arms may readily actuate the mechanism by pulling upon lever 32 so as to cause bell crank 30 to move the latch rod 27 out of engagement with the plate 28, whereupon spring 25 will at once act to force the supporting arms forwardly. This action will cause the vehicle supported by the jack to be moved rearwardly or discharged from the jack.

The housings 16 each confine a pair of arms 33, similar in construction to the arms at the rear end of the track for supporting the forward end of the vehicle. The arms 33 comprise sectional members similar to those indicated at 17 and 19 at the rear end of the jack, with the exception of the construction of the upper ends of upper portions 19. The arms 33 are pivotally secured at their upper extremities to the supporting bars or rails 34, and it is preferred that the foremost of the arms 33 be shorter than the other arm so that these bars or rails 34 will incline upwardly from the front toward the rear end of the jack. The rails 34 in the present instance constitute metallic bars as shown to form spaced parallel portions, between which is confined a wear or supporting plate 35. Each supporting plate is provided with a longitudinally disposed slot 36, through which the pivots 37 at the upper ends of arms 33 project. Each pivot carries a roller 38 so that friction between the wear plate and the supporting pivots is reduced to a minimum. It will be observed that the width of the wear or supporting plates 35 is such that one of the longitudinal edges of these plates projects above the corresponding edges of the supporting members 34, and these projecting portions of the wear or supporting plates are adapted to engage and support the rear axle of a vehicle. The supporting arms 33 for the members 34 at all times remain parallel, so that the said bars or rails 34, while moving rearwardly, at all times maintain their position at an angle to the floor of the garage.

The rear ends of the members 34 have engaged thereto the forward extremities of links 39, the rear ends of the said links being pivotally connected to the front axle supporting arms at the rear of the jack. These links may be provided with turnbuckles 40 to enable minute adjustment to be made. The latch bar 27 may also be equipped with a turnbuckle such as indicated at 41, for similar purposes.

The opposing housings upon the guard rails 11 are connected by bars 42 arranged diagonally of the frame constituting the jack. These bars may be made of relatively thin flat metal, and are pivoted together as at 43 at their point of crossing. The extremities of these bars are connected to the housings 15—16 by bolts or pins, and these bars constitute efficient brace bars for the jack structure. When it is desired to increase or diminish the distance between the tracks, the cross bars may be detached at their extremities from their respective housings, and after the adjustment has been made they may be reattached to their housing, either by inserting the bolts in different openings in the housings, or by securing the extremities of the cross bars to the pivot members for the arms confined by the said housings. After the bolts have been properly adjusted it is obvious that the tracks will be rigidly held together in proper spaced relation.

The tracks 10 are provided near their rear ends with the inclined blocks 44. These blocks receive and support the front wheels of the vehicle as the latter passes rearwardly upon the tracks. The thicker ends of the blocks terminate slightly in advance of a line parallel with the vertical dead center of the front axle supporting arms, and these thicker ends may be recessed as at 45 to permit of the tread of the wheel readily passing beyond the said thickened end. The tracks 10 near their forward ends may be provided with a covering 46 of suitable material and upon which the rear or driving wheels pass just prior to the operation of the jack.

After the jack has been properly positioned within the garage and adjusted with the proper width and wheel base of the vehicle, the jack is ready for operation. The springs 25 normally hold the parts in position to receive the vehicle. The front wheels of the vehicle are properly guided upon the tracks 10 by the curved portions 12 at the forward ends of the guard rails, and the advance of the vehicle upon the jack causes the front wheels to travel up the inclined faces of blocks 44. The bars or rails 34 near the forward end of the jack are, when in inoperative position, sufficiently low to permit of the front axle passing therefrom without engaging the same, but the abutment members 23 upon the arms at the rear end of the jack lie in the path of the front axle of the vehicle and are adapted to be engaged thereby. The engagement of the front axle with these abutment members causes the arms at the rear end of the jack to swing rearwardly, and this rearward movement continues until the arms have been swung past the vertical dead center. During this rearward swinging movement of the arms, the supporting members at the forward end of the jack have been moving bodily upward and into engagement with the rear axle of the vehicle. As soon as the arms supporting the front axle of the vehicle pass the vertical dead center, the tires of the front wheels move beyond the ends of the blocks 44, whereupon the weight of the forward end of the vehicle will be thrown upon the supporting arms. This will cause these arms to move to their rearward limit, and during such movement the supporting members at the forward end of the jack are brought into engagement with the rear axle of the vehicle and lift the latter upwardly until the wheels supported thereby are clear of the trackway. As soon as the arms supporting the front axle have moved to their rearward limit, the latch shoulder engages with the latch plate 28, and the jack mechanism is held against movement in the reverse direction. While thus supported above the ground the vehicle wheels or tires may be inspected or repaired, as all of the wheels are out of contact with the ground. When it is desired to remove the car from the jack, the operator occupying the chauffeur's seat will grasp the lever 32 and move the same inwardly, whereupon the bell crank 30 is caused to move the latch bar out of locking engagement with the plate 28. The springs 25 at once operate to force the rods 24 forwardly, thus pulling the axle supporting arms forwardly past the dead center. The weight of the car then operates in conjunction with these springs to move the mechanism to initial or inoperative position, and the vehicle drops down upon the tracks 10.

By mounting the wear or supporting plates 35 upon the rollers, slight longitudinal movement of these plates is permitted, which will facilitate the free sliding forward movement of the vehicle during the discharging operation.

Having thus fully described my invention, I claim:—

1. In a vehicle jack, means engageable by the forward end of the vehicle for raising the said end, supporting members actuated by the said means for raising the opposite end of the vehicle, means for locking the said means and members in vehicle supporting position, rollers on said members, and contact plates mounted on said rollers and adapted to engage and support the said vehicle.

2. In a vehicle jack, a pair of arms adapted to be engaged by the axle of a vehicle and to be moved so as to move the said axle upwardly, movable supporting members adapted to move upwardly beneath the rear axle of the vehicle, links connecting the said arms with the said members whereby the latter will be actuated simultaneously with the arms, rollers on said members, and slotted contact plates receiving and supported by said rollers and movable longitudinally of the arms to engage and support the rear axle of the vehicle.

3. In a vehicle jack, axle engaging arms adapted to raise the axle of a vehicle, the said arms arranged to be past dead center when in axle supporting position, slidable links pivotally connected with the arms, springs embracing and tensioned by the movement of the links to move said arms to lowered position, the said springs being tensioned only when the said arms have reached dead center, locking means connected to and movable with the arms for holding said arms against the tension of said springs, and means for releasing said locking means.

4. In a vehicle jack, a pair of swinging arms adapted to be engaged by the front axle of a vehicle, swinging arms carrying supporting members to engage the rear axle of the vehicle, links connecting the front and rear swinging arms, slidably mounted rods pivotally connected with the front swinging arms, springs encompassing and tensioned by the movement of said rods when the front swinging arms are swung forwardly past dead center, a fixed locking element, a longitudinally sliding and vertically tilting latch rod movable through said fixed locking element and pivotally connected with a front swinging arm, said rod having a notched portion to engage the fixed locking element when the swinging arms are swung forwardly past dead center, and means operative to lift the notched end of the latch rod out of engagement with the fixed locking element, whereby to permit the swinging arms to be moved rearwardly by the action of the tensioned springs.

5. In a vehicle jack, a pair of arms capable of swinging vertically, the said arms being extensible, a bar connecting said arms, a wear plate carried by said bar and having a slot therein, roller bearings in said arms and in said slot and supporting said wear plate, the said wear plate projecting above the said bar, and means for moving said arms upwardly.

6. In a vehicle jack, a pair of arms capable of swinging vertically, means for adjusting the length of said arms, a bar connecting said arms, a wear plate carried by said bar and having a slot therein, roller bearings in said arms and in said slot and supporting said wear plate, the said wear plate projecting above the said bar, means for moving said arms upwardly, means for securing said arms in said upward or operative position, means for releasing said arm securing means, and automatic means for returning said arms to normal inoperative position simultaneously with the release of said arm securing means.

7. In a vehicle jack, a pair of arms capable of swinging vertically, means for adjusting the length of said arms, a bar connecting said arms, a wear plate carried by said bar and having a slot therein, roller bearings in said arms and in said slot and supporting said wear plate, the said wear plate projecting above said bar, means for moving said arms upwardly, locking means for said arms in upward or operative position, means for releasing said locking means, and tensioned springs acting to return said arms to normal inoperative position simultaneously with the release of said locking means.

In testimony whereof I affix my signature.

LOUIS M. FISHER.